United States Patent
Barga et al.

(10) Patent No.: US 6,820,218 B1
(45) Date of Patent: Nov. 16, 2004

(54) PERSISTENT STATEFUL COMPONENT-BASED APPLICATIONS VIA AUTOMATIC RECOVERY

(75) Inventors: Roger S. Barga, Newcastle, WA (US); David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 09/946,092

(22) Filed: Sep. 4, 2001

(51) Int. Cl.$^7$ .............................................. G06F 11/00
(52) U.S. Cl. ............................ 714/17; 714/16; 714/18
(58) Field of Search .......................... 714/15, 16, 17, 714/18; 719/313, 318; 707/202

(56) References Cited

U.S. PATENT DOCUMENTS

| | | | | |
|---|---|---|---|---|
| 5,875,291 A | * | 2/1999 | Fox ............................... | 714/15 |
| 6,052,695 A | * | 4/2000 | Abe et al. .................... | 707/202 |
| 6,701,456 B1 | * | 3/2004 | Biessener ..................... | 714/20 |
| 6,732,123 B1 | * | 5/2004 | Moore et al. ................ | 707/202 |
| 6,735,716 B1 | * | 5/2004 | Podanoffsky ................ | 714/10 |

OTHER PUBLICATIONS

Barga, R. et al., "Persistent Client–Server Database Sessions," 7$^{th}$ Int'l. Conf. On Extending Database Technology, Lake Constance, Germany, Mar. 2000, 15 pages.

Barga, R. et al., "Measuring and Optimizing a System for Peristent Database Sessions," Proc. ICDE, Heidelberg, Germany, Apr. 2001, 10 pages.

Barga, R. et al., "Phoenix: Making Applications Robust," (demo paper) Proc. of ACM SIGMOD Conference, Philadelphia, Pennsylvania, Jun., 1999, 3 pages.

Lomet, D.,. "Persistent Applications Using Generalized Redo Recovery," IEEE Int'l. Conference on Data Engineering, Orlando, Florida, 1998, 10 pages.

Lomet, D. et al., "Efficient Transparent Application Recovery in Client–Server Information Systems," ACM SIGMOD Int'l. Conf. on Management of Data, Seattle, Washington, Jun., 1998, 12 pages.

Lomet, D., et al., "Logical Logging to Extend Recovery to New Domains", ACM SIGMOD International Conference on Management of Data, Philadelphia, Pennsylvania, 1999, 12 pages.

* cited by examiner

Primary Examiner—Robert Beausoliel
Assistant Examiner—Yolanda L. Wilson
(74) Attorney, Agent, or Firm—Woodcock Washburn LLP

(57) ABSTRACT

Persistent components are provided across both process and server failures, without the application programmer needing take actions for component recoverability. Application interactions with a stateful component are transparently intercepted and stably logged to persistent storage. A "virtual" component isolates an application from component failures, permitting the mapping of a component to an arbitrary "physical" component. Component failures are detected and masked from the application. A virtual component is re-mapped to a new physical component, and the operations required to recreate a component and reinstall state up to the point of the last logged interaction is replayed from the log automatically.

7 Claims, 7 Drawing Sheets

| Type | Comp. CLSID | Comp. Location Info | Comp. Context | Iface ID | Logical ID |
|---|---|---|---|---|---|
| | | | | | |

TYPE = Create
Component CLSID = identify the class
Component location information = identity of the machine
Component context = context in which the component is to be created
I-face ID = identify the interface currently being used
Component Logical ID = logical identifier assigned to the component

Fig. 7

| Type | Client CLSID | Client log. inst ID | Server CLSID | Server log. inst ID | I-face ID | Method Index | Method log. ID | Args. Retval |
|---|---|---|---|---|---|---|---|---|
| | | | | | | | | |

TYPE = (Call | Return)(First|Replay)
Client CLSID = identify the class
Client log. instance ID = identify the instance
Server CLSID = identify the class
Server log. instance ID = identify the instance
I-face ID = identify the interface currently being used
Method index = method called
Method log. ID = instance of method call

Fig. 8

| Type | Component CLSID | Component log. inst ID | LastFlushedMethod |
|---|---|---|---|
| | | | |

TYPE = LOG-FLUSH|CHECKPOINT
Component CLSID = identify the class
Component log. instance ID = identify the instance
LastFlushedMethod = corresponds to the method log. ID

Fig. 9

PERSISTENT STATEFUL COMPONENT-BASED APPLICATIONS VIA AUTOMATIC RECOVERY

FIELD OF THE INVENTION

The present invention relates generally to the field of computer systems and applications that execute on them and, more particularly, to the automatic recovery of stateful application components when the computer system or process supporting the components fails.

BACKGROUND OF THE INVENTION

A component is a discrete unit of code that delivers a specified set of services through specified interfaces. Components provide the services that clients request at run time. A stateful component maintains private state resulting from the execution of one or more method calls. Thus, for example, a client application connecting to a component can have a "conversation" with the component that spans multiple method calls. The component can retain state across those method calls.

Building stateful components is a useful approach in application design. Programmers typically write stateful applications that retain state across component method calls. This provides the information necessary for correct and successful execution across transaction boundaries. However, such stateful components have availability and scalability limitations. One problem with stateful applications is the risk of losing the volatile state as a result of component failure when the system or process supporting the stateful application fails. Such a failure typically requires human intervention to repair or restart the application. Service outages can be very long because of this. A conventional response to this problem is to insist that applications be stateless. A stateless application has "no meaningful state maintained between transactions". The loss of the component state prevents the masking of system failures from clients, and degrades application availability.

In view of the foregoing, there is a need for systems and methods that overcome the limitations and drawbacks of the prior art.

SUMMARY OF THE INVENTION

The present invention provides persistent stateful components via transparent logging and automatic recovery. Persistent component state is based on method logging, in which interactions between components are intercepted and stably logged. Information sufficient to re-create a component and reinstall state up to the point of the last logged interaction (e.g., via redo recovery of the logged method calls) is persisted on stable storage. In the event of a system failure, aspects of the present invention automatically recreate failed components and recover lost state, without the stateful application itself needing to take measures for its recovery.

An embodiment of the present invention allows stateful application components to begin and end transactions, and, because these components have a state outside of transactions (i.e., a state that can persist across system failures), they are able to recognize transaction error codes, and act on them accordingly. For example, such an application can test the error code and decide whether to simply re-execute the transaction or change input parameters before re-execution, and decide at what point to abandon the effort and return an error code to the caller describing what has happened.

Thus, component-based applications can be written "naturally" as stateful programs. The present invention deals with system failures by logging component interactions and possibly checkpointing state to ensure that the application state can be automatically recovered should a failure occur.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 7, 8, and 9 show various exemplary log record formats in accordance with the present invention.

DETAILED DESCRIPTION OF PREFERRED EMBODIMENTS

Overview

The present invention is directed to making normally volatile and stateful components, e.g., COM components, persistent across both process and server failures, without the component itself needing to be aware of its recoverability. Persistent components provide improved application availability and reduce the application-programming task of coping with system failures. The present invention incorporates logging, in which interactions between stateful volatile components are captured and stably logged. Using "virtual" components isolates the application from component failures, permitting the mapping of a virtual component to an arbitrary "physical" component. Component failures are detected and masked from the application program, and the virtual component is re-mapped to a new physical component into which the virtual component state is installed. Virtual components can also be re-mapped to physical components to enable scalability and load balancing. The result is persistent stateful components that can survive system failures without applications being aware of the outage.

The present invention enables robust applications by providing transparent recovery from various kinds of system failures. This enhances application availability by avoiding the extended down-time that such failures can produce. The present invention "wraps" component-based applications so as to perform logging that will enable transparent recovery from crashes. The ability to programmatically respond to transaction aborts is provided because application logic can exist outside of a transaction.

The present invention provides high availability by performing redo recovery for application components using its own logging and recovery infrastructure. Replay of an application component replaces those interactions with the logged effects of the interactions that took place originally. Hence, replay may be much faster than original execution.

Computing Environment

Figure 1:
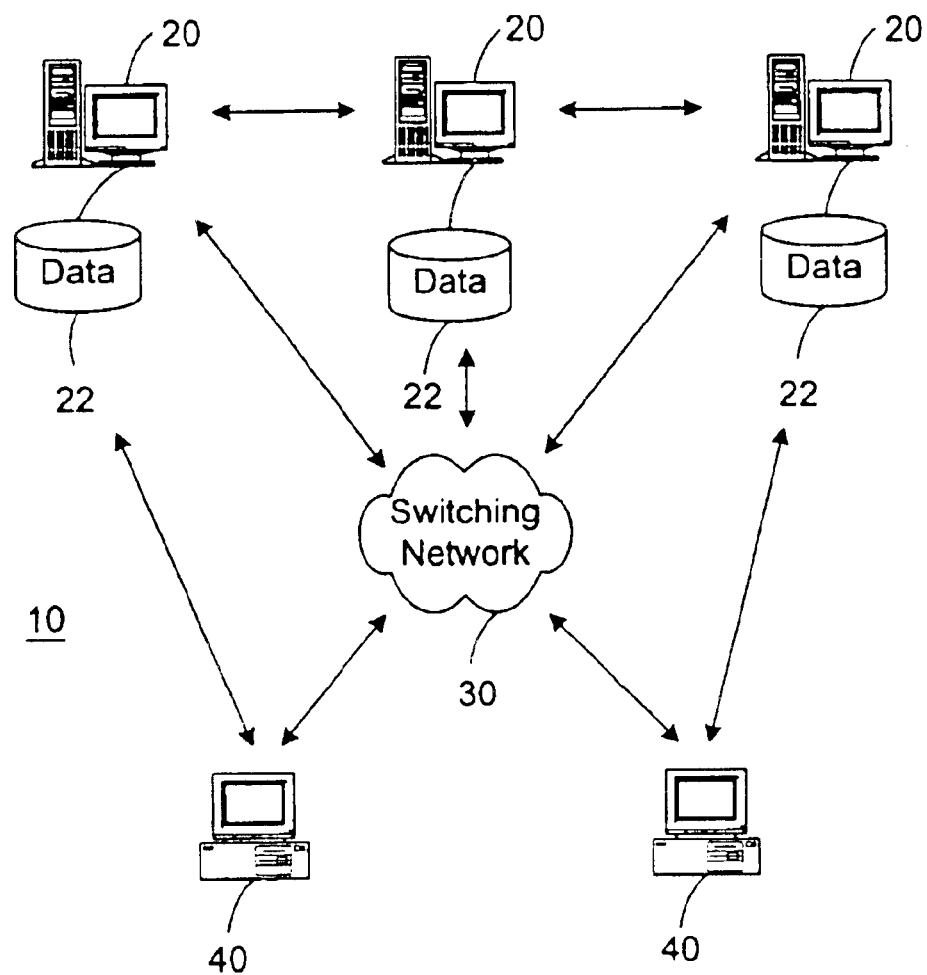
FIG. 1 illustrates a high level example of a distributed computing environment in which the invention may be implemented.

FIG. 1 illustrates a high level example of a distributed computing environment 10 in which the invention may be implemented. A plurality of servers 20, each having memory 22, are interconnected, either directly or through an optional switching network 30. A plurality of clients 40 are connected to the servers 20, either directly or through the optional switching network 30. Each of the clients 40 and servers 20 are described in further detail below.

Figure 2:
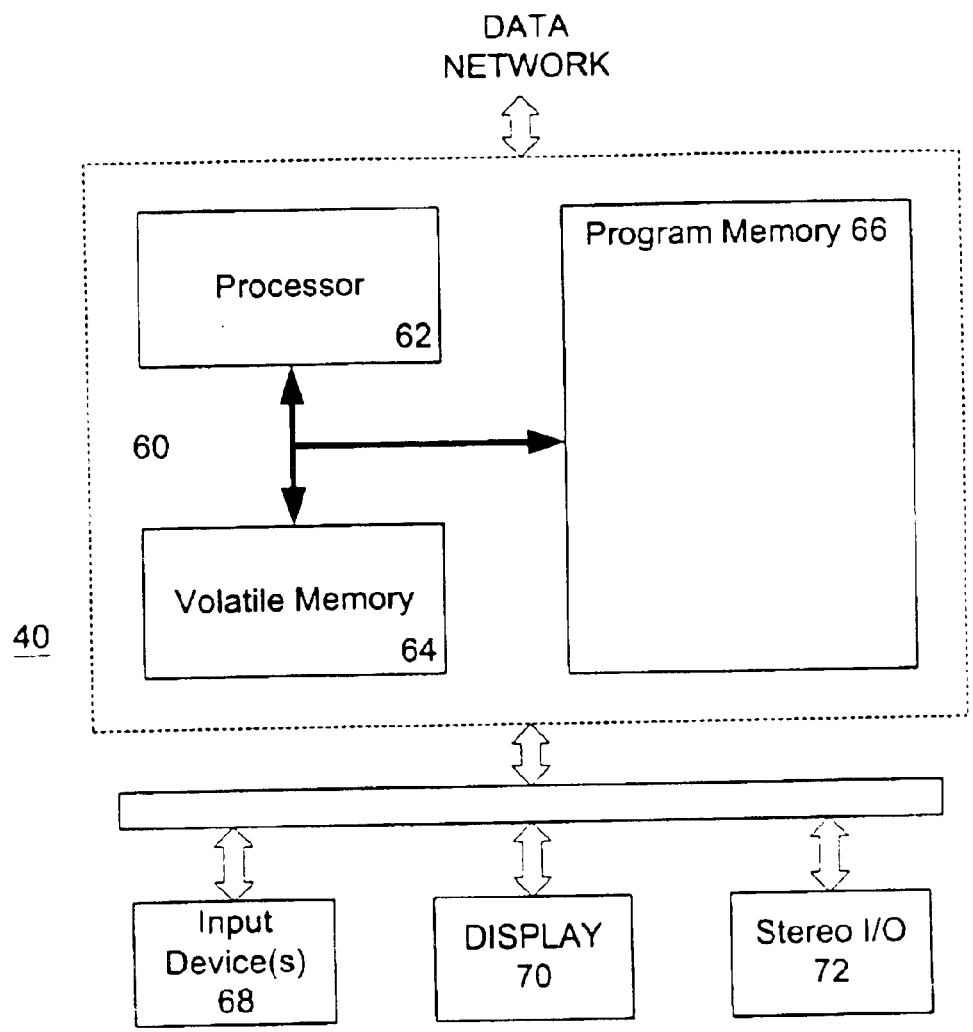
FIG. 2 shows an exemplary configuration of a client implemented as a computer.

FIG. 2 shows an exemplary configuration of a client 40 implemented as a computer. It includes a central processing unit 60 having a processor 62, volatile memory 64 (e.g., random access memory (RAM)), and program memory 66 (e.g., read only memory (ROM), flash, disk drive, floppy disk drive, CD-ROM, and the like). The client 40 has one or more input devices 68 (e.g., keyboard, mouse, etc.), a computer display 70 (e.g., VGA, SVGA), and a stereo I/O 72 for interfacing with a stereo system.

The client 40 runs an operating system that supports multiple applications. The operating system is preferably a multitasking operating system that allows simultaneous execution of multiple applications. The operating system employs a graphical user interface windowing environment that presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems that provide windowing environments may be employed, such as the Macintosh operating system from Apple Computer, Inc. and the OS/2 operating system from IBM.

Figure 3:
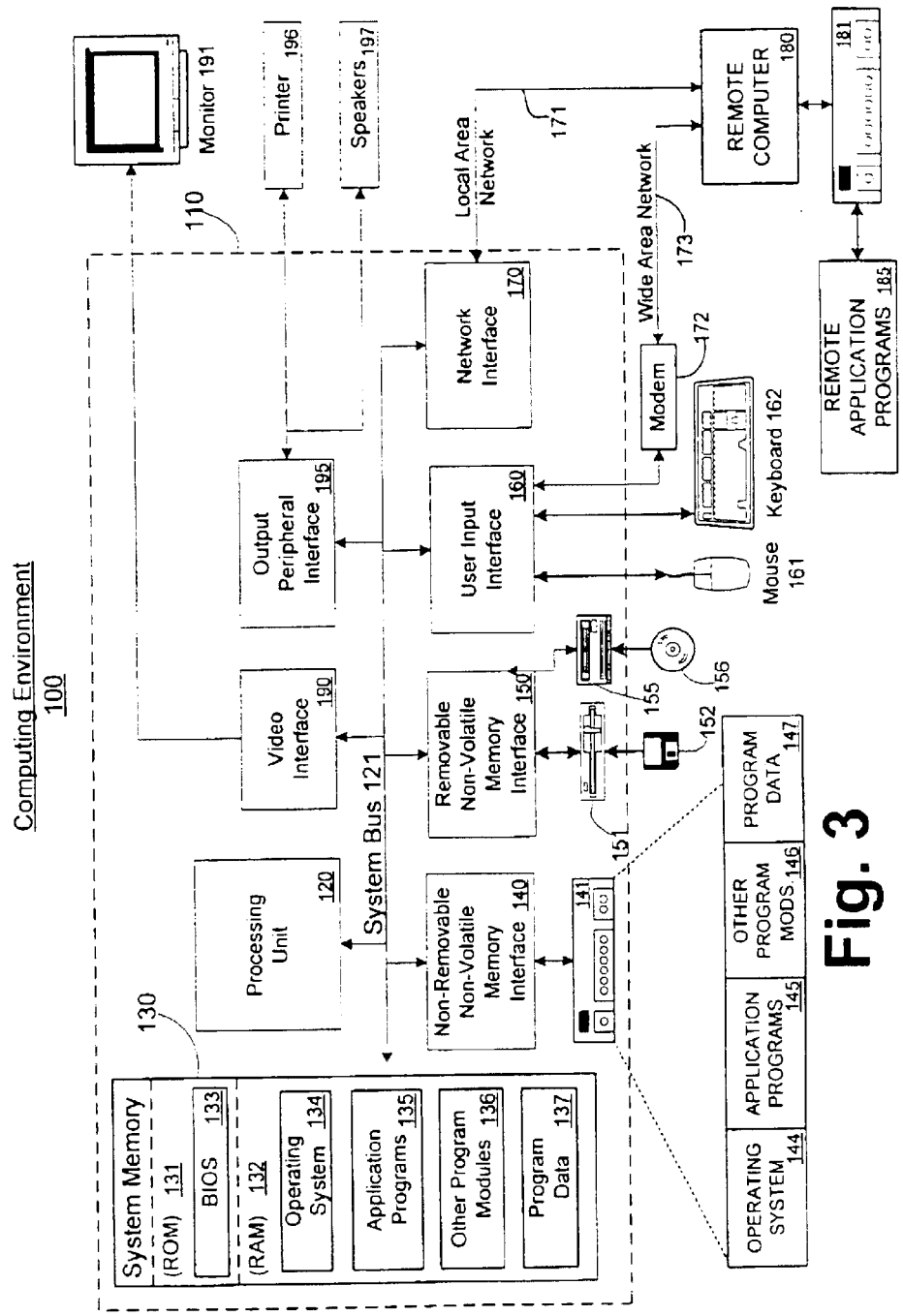
FIG. 3 is a block diagram showing an exemplary computing environment in which aspects of the invention may be implemented.

FIG. 3 illustrates a more detailed example of a suitable computing system environment 100 in which the invention may be implemented. Each server and client can incorporate the environment 100 of FIG. 3. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Stateful Applications

Stateful application components can begin and end transactions, and, because these components have a state outside of transactions (and a state that persists across system failures), they can recognize transaction error codes, and act on them accordingly. For example, such an application can test the error code and decide whether to re-execute the transaction or change input parameters before re-execution, and can decide at what point to abandon the effort and itself return an error code describing what has happened.

Stateful application components can be recovered (have their state re-created) by logging non-deterministic events, and replaying those events during recovery. Between the logged events, the application itself can be re-executed because the non-deterministic events have been made deterministic by logging and subsequently replaying the now deterministic events from the log. Such components are called piece-wise deterministic (PWD) components.

Replay after failure involves a different process and thread than used by the original execution. Therefore, objects are virtualized by providing logical identifiers for them that are independent of how the objects are mapped to processes or threads. A logical identifier identifies the class code and the persistent state of an instance. During execution, these persistent logical identifiers are mapped to the specific threads and processes realizing the objects.

Transparent persistence is achieved with the use of virtual components. Virtual components isolate an application from physical component failure. Virtual components are saved during processing, and after a failure, physical components are re-mapped using the saved virtual components.

Component Execution

In order to perform component recovery (via replay), the present invention logs, during normal execution, information sufficient to re-create a component and recover its state to the last logged interaction. An activation hook (interception code invoked during component creation) is implemented that logs information related to component creation, and policy functions (interception code invoked during method calls and returns) are implemented that log interactions (calls and responses) between client and server components. Each component is associated with a context that defines the boundary at which interception takes place.

Figure 4:
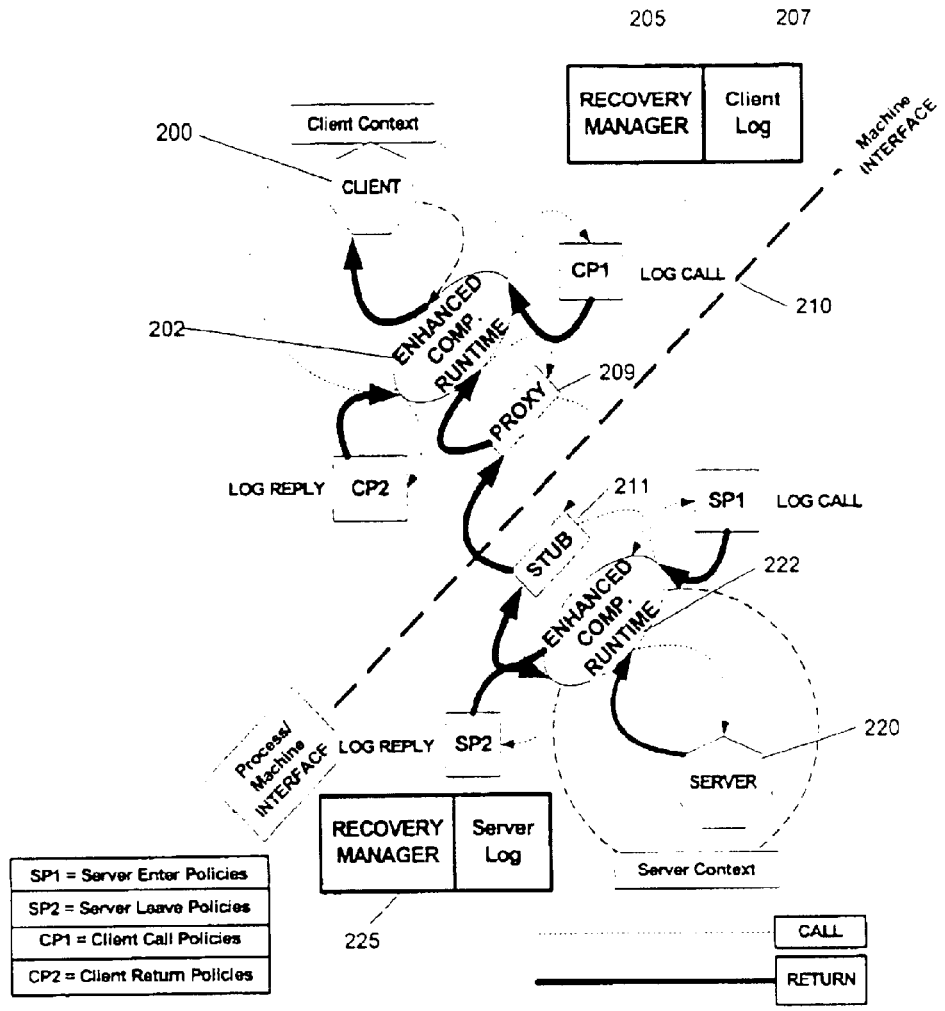
FIG. 4 illustrates an exemplary position and relationship of various functional pieces of a component-based application running in accordance with the present invention.

FIG. 4 illustrates the position and relationship of various functional elements of a component-based application running in accordance with the present invention. The elements 200 and 220 can be any component, such as that acting as a client, server, or both, and that the invention should not be limited to the recovery of components acting in the role of a server responding to requests from other client components. For simplicity, it is assumed that the client 200 and server 220 are disposed in different processes or machines, so there are two different component runtimes (a client-side component runtime 202 and server-side component runtime 222), along with a proxy 209 and a stub 211.

With respect to FIG. 4, there is a logging policy on each of CP1, CP2, SP1, SP2, and there is an activation hook registered with both client (through a policy) and server contexts. The activation hook records (logs) information regarding the creation of an object. An error handler (not shown in FIG. 4; elements 201, 221 in FIG. 5) is registered with each component runtime 202, 222. Furthermore, two recovery managers 205, 225 are provided because of the machine boundary 210 between the server 220 and the client 200.

When the client 200 wants to call the server 220, the call is intercepted by the component runtime 202 (also referred to as an enhanced component runtime) which then invokes caller policies CP1, CP2. One of the caller policies is logging which captures the message in a log 207 and the call gets passed to the proxy, a unit of code in the local process that stands in for the server. The proxy 209 then sends the message, e.g. a method call message, across the boundary 210 to the stub 211. The stub acts for the client in the server process, The stub calls the server side component runtime 222, which invokes policies SP1, SP2 and then delivers the call.

Error Handling and Recovery

A recoverable failure may occur for several reasons including: (1) the proxy associated with the server object returns a failure indicating that it is disconnected from the server—this happens when the server process shuts down on a failure; (2) one of the policies in the server context nullifies the call with an interface specific error that indicates a recoverable failure; and (3) the server object itself returns the above error on a call. In such cases, the component runtime on the client side will detect an error. Note that in the first case the server process does not exist any more. When the client's component runtime gets an error on a call, it calls an error handler that is already registered with the component runtime.

The component runtime passes the identity of the call that failed to the error handler. The information includes the identity of the server, the identity of the client, and the identity of the method. The error handler determines if the cause of the error is from component failure and, if so, invokes the local recovery manager (LRM) to recover the failed component. The error is masked from the client and recovery is initiated.

If recovery is successful, the recovery manager will return a new component reference to the recovered component to the error handler. The error handler updates component runtime tables on the client and logs the recovery event. Finally, the error handler returns control to the component runtime for normal method processing. Otherwise, if recovery is unsuccessful, the error handler unmasks the error by returning a code indicating failure to the component runtime. Moreover, the error handler allows for canceling or repeating the call, and can examine the call state (e.g., ID, method, parameters, etc.).

Figure 5:
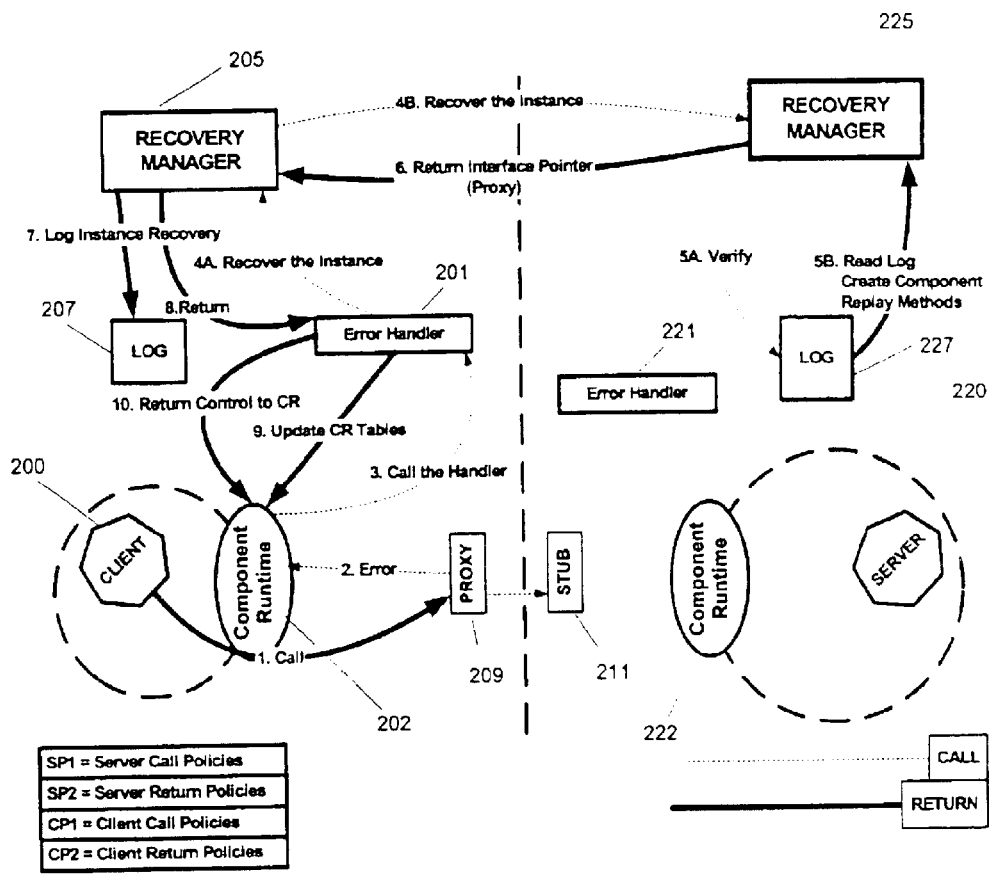
FIG. 5 illustrates an exemplary flow of control in server failure in accordance with the present invention.

FIG. 5 illustrates an exemplary flow of control in server failure in accordance with the present invention. Regarding server failure, it is assumed a client 200 detects the failure during processing of a call, or more accurately the component runtime 202 on a client 200 detects the error. The recovery manager that recovers the failed component can be on the same machine as the failed component, though this is not necessary.

In FIG. 5, the server recovery manager (SRM) 225 takes the following steps to recover the failed component. It is first verified that the component has not already been recovered. An instance of the failed component is re-created. Methods from the log are replayed against the re-created component and the component is brought to the state of the last logged interaction. Control is returned to the local recovery manager (LRM) 205, with the interface pointer passed back to the recovered component. The error handler 201 on the client 200 updates the component runtime tables and returns control to the component runtime 202 so that method execution can resume normally.

Component Recovery

Figure 6:
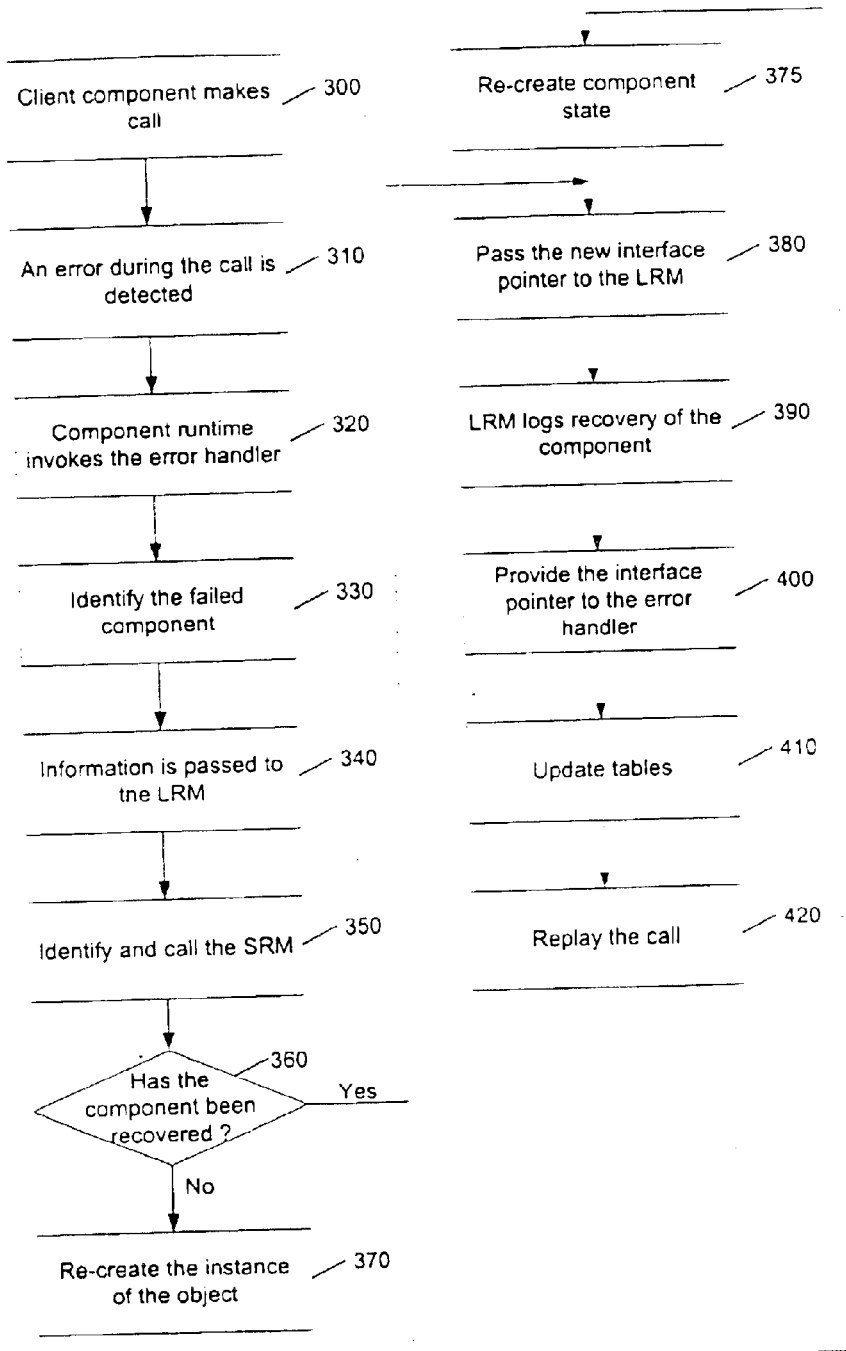
FIG. 6 is a flow chart of an exemplary recovery method in accordance with the present invention.

FIG. 6 is a flow chart of an exemplary recovery method in accordance with the present invention. At step 300, a call is made by the client component through the component runtime. At step 310, an error is detected during the call and processing is returned to the component runtime. At step 320, the component runtime invokes the error handler, passing information related to the call. At step 330, the error handler uses this information to identify the failed component and then gathers additional information that will be used to process the forthcoming recovery request. At step 340, the error handler then calls the LRM and passes the information. The error handler blocks until this call returns.

At step 350, the LRM identifies the SRM, which is responsible for the component, via a table lookup or other discovery process, and then calls the SRM using a timeout (in case the SRM process or machine is down), passing information about the failed component. To identify the recovery manager, given the server, the LRM performs a lookup in a global table, for example, to get a handle for the SRM. This lookup could also be implemented as a discovery service.

The SRM is called to recover the failed component. At step 360, the SRM checks an in-memory structure or log to determine whether the component has already been recovered with the client having a stale interface pointer (reference). With a lazy update, for example, it is possible another client or process already recovered the component, and this was not broadcast. If the component has been recovered, processing continues at step 380; otherwise, at step 370, the SRM reads its log to locate the activation log record and then re-creates the instance of that object. This new instance will have a different interface pointer, but is assigned the same logical ID as the old one. For example, the SRM creates a special component on the server using the COM cocreate call. This object will be used to issue a "create instance" call. The SRM preferably assigns the component the same logical ID as before.

At step 375, the SRM reads the log and replays methods on the server to re-create the component state. The SRM scans the log, using the logical ID of the failed component to identify log records pertaining to the failed component. The SRM creates the new component instance by reading the activation log record from the server log and replaying the creation call. During recovery the SRM intercepts method return values. Next, the SRM invokes these logged method calls one by one against the new component, dropping the method return values. When completed, handles and other references to the component are updated with the new interface pointer.

At step 380, once the object has been brought back to the state it was in before failure, the SRM returns to the LRM, passing back the new interface pointer. The SRM returns to the LRM with information about the new server instance, so the component runtime tables on the client side can be modified. Also, the SRM logs the recovery of the component on the server log.

At step 390, the LRM logs the recovery of the component, along with the new identifier, then at step 400, returns the new interface pointer to the error handler. At step 410, the error handler updates component runtime tables with the new interface pointer, and returns a status code to the component runtime indicating success. At step 420, the component runtime replays the method call using the marshaled arguments (which are placed on the stack). If there is an error during the method call, processing will return to step 320; otherwise, control returns to the client.

Logging

Regarding information that is logged to facilitate component recovery, it is specified below what is logged, where the value will originate (e.g., context variable, from the object create call or method call, off the stack, etc.), and the format of the resulting log record. Sources of information include, but are not limited to: information associated with object creation; the mapping between the logical identifier for a component and its current interface pointer; and information associated with method call and return, at both client and server. There is other desirable information for recovery that can be logged, such as component state checkpoints, session information between client and server components, recovery actions, etc.

During client creation, an activation hook intercepts the creation call for the component. The activation hook code contacts the recovery manager, providing arguments pertaining to the creation of the component. The recovery manager generates a new logical identifier for the component, and then logs the creation information. An exemplary log record format is shown in FIG. 7. A logical identifier is associated with the machine on which the component is created, location information of the context, and the class ID (CLSID) for the component.

For server creation, the client calls for the creation of the server on the same or different machine. During component creation the activation hook code running on the server can gather the CLSID, location information, logical ID, etc. for the server component in a manner similar to client creation.

At this point, both client and server components have been created and log records detailing the creation information have been written to the log. To complete initialization, the client is made aware of the server and, similarly, the server is made aware of the client.

To make the server aware of the client, the activation hook on the client can contact the SRM through the LRM to pass it the desired information. The LRM has a mapping of the client's pointer to all the desired information. To make the client aware of the server, the activation hook on the client can record the desired information in the log or pass it to the LRM.

Once both server and client components have been created and properly initialized, each can associate a reference for the other component with the information desirable to re-create the peer.

During a method call, the client-side logging policy will log information pertaining to the call, including the client identity, server identity, method identity, and arguments to the method. Each method call is stamped with a new logical ID by the client side logging policy. Arguments to the method call sitting on the stack are serialized. The client identity and the method identity, including the logical ID of the method, are passed to the server side policy using the buffer. The server logging policy records this information, including its own identity. The same procedure is executed on the return of the call.

To log for method invocation and response, the exemplary format of the log record is used as shown in FIG. 8. On a per-method basis, the following is desirably logged. (1) identity of the client component comprising the client component class ID (type CLSID); and the client component logical ID; (2) identity of the server component comprising the server component class ID (type CLSID); and the server component logical ID; (3) identify call comprising the interface ID (IID) on which the method was called; method identifier—an index or name for the method; method instance unique identifier—preferably this identifier is unique to the log for the call. This is because it is desirable to uniquely identify the call, which is not always possible using just its name and arguments. If the method was called twice with the same arguments, then the return values might be different based on server state. The argument can be pre-marshal or post-marshal. Pre-marshal permits checks for pointer validity, whereas post-marshal permits pointer invalidity survival.

Regarding logging for completion/checkpoint, when a component goes stateless, that information is desirably retained in a log record, as this indicates that recovery of the component is no longer needed for the component state, though it still might be used to re-create the component's messages or calls. An exemplary log record for this is shown in FIG. 9.

It is contemplated that the invention can recover any component, whether it is acting in the role of client, server, or both, and that the invention should not be limited to the recovery of components acting in the role of a server responding to requests from other client components.

The recovery manager responsible for the component, referred to as the component recovery manager (CRM), is identified. The appropriate CRM is then called to recover the failed component. Assuming execution is now taking place on the CRM, it is verified that the component has not already been recovered. The CRM searches an in-memory structure or log. If it is determined that the component has already been recovered, the CRM returns an interface pointer for the already recovered component. Otherwise, the CRM creates a new instance of the failed component by reading the activation log record from the log and replaying the creation call. The state for the component is reinstalled by replaying calls associated with the failed component from the log. A recovery analysis pass may be performed on the log to identify the appropriate log records. Preferably, all references to the component are then updated with the new interface pointer. The CRM will log the recovery of the component on the log, and then return the new component identifier to other recovery managers.

If recovery is successful, the CRM recovery manager returns a status code indicating success and a new physical identifier for the recovered component (a physical component supporting the virtual persistent component, hence changing the virtual-to-physical mapping of the recovered component) to the error handler. The error handler will update component runtime tables with the new component identifier and return a status code to the component runtime indicating it can resume (retry) method execution; otherwise, the handler will return an error code to the component runtime.

Embodiments of the present invention are based on an environment mechanism called contexts. A context is a component wrapper mechanism that transparently intercepts object events, such as creation, activation, and method calls. New component services can be introduced to the runtime by implementing "handlers", referred to as policies, for object events and calls, and including them "in the context". However, the invention is applicable to any runtime infrastructure in which interception of interactions between components is possible.

Automatic recovery is provided by the composition of context policies that work together to log component state and method calls, and in the event of system failure, to mask the failure from the application and initiate recovery actions to reconstruct impacted components.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the versioning functionality of the present invention.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A method of providing transparent recovery of stateful piece-wise deterministic (PWD) components having a component state in a computer system, comprising:
   intercepting events comprising at least one of a plurality of method calls, component activations, and component deactivations;
   logging the events during execution of the components;
   detecting a failure of one of the components based on an error detected during execution;
   replaying the logged events to recover the component state;
   reading the log via a recovery manager and replaying the logged events;
   re-executing the component between logged events; and
   communicating to other recovery managers and to an error handler new information about a logical component.

2. A method of providing transparent recovery of stateful piece-wise deterministic (PWD) components having a component state in a computer system, comprising:
   intercepting events comprising at least one of a plurality of method calls, component activations, and component deactivations;
   logging the events during execution of the components;
   detecting a failure of one of the components based on an error detected during execution, wherein the computer system comprises a client and a server, and detecting the failure of the component comprises the client or server detecting the failure, and further comprises a component runtime associated with the client invoking an error handler associated with the client and providing information related to the failed call to the error handler;
   identifying a recovery manager responsible for the component and passing the information to the recovery manager; and
   replaying the logged events to recover the component state;
   wherein the component has an initial interface pointer and a logical ID, and replaying the at least one call to recover the component comprises:
   the recovery manager recreating the component based on information in a storage log;
   providing an interface pointer to the re-created component, the interface pointer different from the initial interface pointer; and
   providing the logical ID to the re-created component.

3. A system for providing recovery in a computer system, comprising:
   a first system comprising:
      a first storage device that comprises information associated with at least one call and a component,
      a first component runtime that detects a failure of the component based on an error during processing of one of the at least one call and retrieves information related to the failed call from the first storage device,
      a first error handler that receives the information from the first component runtime and identifies the component and retrieves further information from a memory,
      a first recovery manager that receives the further information from the first error handler and identifies a second recovery manager; and
   a second system comprising:
      the second recovery manager that recovers the failed component, and
      a second storage device that comprises logged interactions pertaining to the component.

4. The system of claim 3, wherein the second recovery manager verifies that the component has not already been recovered prior to recovering the component.

5. The system of claim 3, wherein the second recovery manager retrieves the logged interactions and replays the logged interactions to recover the component.

6. The system of claim 3, wherein the first system acts as a client, the second system acts as a server, and the information comprises an identity of the server, an identity of the client, and an identity of the failed call associated with the component.

7. A computer readable medium having computer-executable instructions for performing the steps comprising:
   intercepting events comprising at least one of a plurality of method calls, component activations, and component deactivations;
   logging the events during execution of at least one stateful piece-wise deterministic (PWD) component having a component state in a computer system;

detecting a failure of one of the components based on an error detected during execution;

replaying the logged events to recover the component state;

reading the log via a recovery manager and replaying the logged events;

re-executing the component between logged events; and communicating to other recovery managers and to an error handler new information about a logical component.

\* \* \* \* \*